United States Patent [19]

Sato et al.

[11] 4,297,450

[45] Oct. 27, 1981

[54] HOT MELT TYPE TRAFFIC PAINT COMPOSITIONS

[75] Inventors: Hisatake Sato; Masaharu Makino; Hideo Hayashi, all of Yokohama, Japan

[73] Assignee: Nippon Oil Co. Ltd., Japan

[21] Appl. No.: 155,209

[22] Filed: Jun. 2, 1980

[30] Foreign Application Priority Data

Jun. 8, 1979 [JP] Japan .................................. 54-72060

[51] Int. Cl.³ .............................................. C08F 8/04
[52] U.S. Cl. ................................. 525/333; 260/23 S; 260/31.8 DR; 260/31.8 HR; 260/31.8 PQ; 260/42; 260/42.43; 260/42.47; 525/190; 525/332; 525/338; 525/339; 526/290
[58] Field of Search ............... 525/339, 338, 332, 333; 526/290

[56] References Cited

U.S. PATENT DOCUMENTS

| | | | |
|---|---|---|---|
| 2,911,395 | 11/1959 | Small | 525/339 |
| 3,442,877 | 5/1969 | Moritz et al. | 525/339 |
| 3,484,421 | 12/1969 | Pine et al. | 525/339 |
| 3,554,940 | 1/1971 | Araknwa et al. | 260/5 |
| 3,917,551 | 11/1975 | Jurrens et al. | 525/339 |
| 3,926,878 | 12/1975 | Shimizu et al. | 260/27 EV |

*Primary Examiner*—William F. Hamrock

[57] ABSTRACT

Hot melt type traffic paint compositions contain as binders partially ring-hydrogenated resins derived by hydrogenating from 20 to 70% of the aromatic rings of an aromatic hydrocarbon resin obtainable by polymerization in the presence of a Friedel-Crafts catalyst of fractions prepared so as to have a conjugated diolefin content of not more than 1.0 wt % and in a ratio of not more than 3.0% with respect to the total amount of polymerizable ingredients and a total content of indene and its alkyl derivatives of not more than 4.0 wt % and in a ratio of not more than 12.0% with respect to the total amount of polymerizable ingredients, said fractions obtained by distillation of cracked oil fractions which have boiling points in the range from 140° to 220° C. and are prepared by cracking of petroleum. These traffic paint compositions provide a favorable antiweathering property, heat resistance and flow characteristics.

13 Claims, No Drawings

HOT MELT TYPE TRAFFIC PAINT COMPOSITIONS

BACKGROUND OF THE INVENTION

1. Field of the Invention

The present invention relates to hot melt type traffic paint compositions and, more particularly, to hot melt type traffic paint compositions containing as a binder a partially ring-hydrogenated aromatic hydrocarbon resin prepared from cracked oil fractions obtainable by cracking of petroleum.

2. Description of the Prior Art

Generally, hot melt type traffic paints contain thermoplastic resins (binders), plasticizers, pigments, fillers, glass beads or the like. These traffic paints are coated on road surfaces by melting them at 150° to 250° C. and become fixed thereon upon cooling. They are employed for white or yellow markings on road surfaces.

Conventional thermoplastic resins of hot melt type traffic paints may include maleic acid resins modified by rosin, alkyd resins, hydrocarbon resins and the like. The rosin-modified maleic acid resins are extensively employed. The use of rosin as a raw material, however, may give rise to some disadvantages with respect to stabilized supply and cost because rosin is a naturally occurring material. Furthermore, traffic paints for which rosin-modified maleic acid resins are employed have other disadvantages in that their whiteness is insufficient and cracks tend to be produced.

In order to overcome such difficulties associated with rosin, hydrocarbons resins from petroleum have been used instead; they are stable in supply and are cheaper than rosin, said hydrocarbon resins being prepared from cracked oil fractions by cracking of petroleum.

When aliphatic unsaturated hydrocarbon resins prepared from cracked oil fractions containing aliphatic unsaturated hydrocarbons having boiling points in the range of 20° to 100° C. are used for hot melt type traffic paints, such paints still have disadvantages in that their flowability is insufficient, fillers used in them tend to sediment faster and cracks are still produced.

On the other hand, aromatic hydrocarbon resins prepared from cracked oil fractions containing unsaturated aromatic hydrocarbons having boiling points within the range of 140° to 280° C. are not satisfactory with respect to heat resistance and anti-weathering, so that they are also unacceptable as binders for traffic paints of hot melt type.

It has previously been found, however, that resins derived from fractions obtained by distillation of fractions having boiling points in the range of 140° to 220° C. from cracked oil fractions prepared by cracking of petroleum and by complete separation of specific ingredients, are favorable in heat resistance, and traffic paints using such resins are satisfactory in sedimentation of fillers and in dirt-repellency. This feature has already been disclosed in the Japanese Patent Publication No. 34,078/1975. It has been found, moreover, that this type of traffic paint can provide a sufficient resistance to yellowing to allow the use of a white pigment such as titanium oxide, if it is used in a relatively large amount; however, when white pigments such as titanium oxide are used in small amounts or when they are applied under severe conditions, they tend to provide coatings which are prone to turn yellow.

As a result of extensive studies aimed at solving these disadvantages, it has now been found that the problems stated above can be solved by using aromatic hydrocarbon resins which are prepared by partially hydrogenating the aromatic rings of aromatic hydrocarbon resins derived from the aforementioned fractions by separating out specific ingredients; thus, the present invention has been proposed.

Accordingly, the primary object of the present invention is to provide hot melt type traffic paint compositions having improved anti-weathering characteristics, a favorable heat resistance, and improved flow characteristics.

Another object of the present invention is to provide hot melt type traffic paint compositions containing as binders partially ring-hydrogenated resins obtainable by hydrogenating 20 to 70% of the aromatic rings of an aromatic hydrocarbon resin obtained by polymerization, in the presence of a Friedel-Crafts catalyst, of fractions prepared so as to have a conjugated diolefin content in an amount of not more than 1.0 wt % and in a ratio of not more than 3.0% of the total amount of polymerizable ingredients, and a total content of indene and its alkyl derivatives in an amount of not more than 4.0 wt % and in a ratio of not more than 12.0% of the total amount of polymerizable ingredients, said fractions having boiling points in the range of 140° to 220° C. and obtained by distillation of cracked oil fractions prepared by cracking of petroleum.

DETAILED DESCRIPTION OF THE INVENTION

The present invention relates to the use of resins as binders for traffic paints, said resins being prepared by hydrogenating a particular amount of the aromatic rings of aromatic hydrocarbon resins derived by removal of unreacted oil fractions and low-polymerized materials through evaporation or distillation after the removal of a Friedel-Crafts catalyst employed for polymerization of the fractions which are derived from cracked oil fractions prepared by cracking of petroleum which have boiling points in the range of 140° to 220° C. and contain unsaturated compounds comprising substantially styrene and its derivatives and indene and its derivatives, and are prepared so as to have a conjugated diolefin content in an amount of not more than 1.0 wt % and in a ratio of not more than 3.0%, and a total content of indene and its alkyl derivatives in an amount of not more than 4.0 wt % and in a ratio of not more than 12.0%. That is, the present invention is characterized by employing, for hot melt type traffic paint compositions, resins prepared by partially hydrogenating the aromatic rings of aromatic hydrocarbon resins, the aromatic hydrocarbon resins being obtainable from particular fractions completely separated from cracked oil fractions of petroleum.

The starting raw material oil to be used in accordance with the present invention includes cracked oil fractions having boiling points in the range of 140° to 220° C. which are by-products obtainable in manufacturing ethylene, propylene, butenes and butadienes by cracking (for example, steam cracking) of petroleum fractions such as naphtha, kerosene or light oil. Table 1 shows constituents of cracked oil fractions having boiling points in this range determined by gas chromatography analysis. Illustrative are representative ingredients having the following boiling points.

TABLE 1

Ingredients in 140–220° C. fractions of cracked oil fractions

| Constituents | Boiling point, °C. (760 mmHg abs.) | Representative Amounts (wt %) |
|---|---|---|
| Styrene | 145.8 | 0.5–15 |
| Allylbenzene | 156–157 | 0.1–1 |
| alpha-methylstyrene | 165.4 | 0.5–6 |
| beta-methylstyrene | 175 | 0.5–6 |
| p-vinyltoluene | 168 | |
| m-vinyltoluene | 169 | 10–25 |
| o-vinyltoluene | 171 | |
| Indene | 182.2 | 2–13 |
| Methylindene homologs | 184–206 | |
| Dimethylindene and ethyl indene homologs | more than 212 | 1–3 |
| Xylene (o-, m- and p-isomers) | 138–142 | |
| Ethylbenzene | 136.2 | 17–10 |
| Isopropylbenzene | 152.5 | |
| Ethyltoluene (o-, m- and p-isomers) | 158–164.6 | 18–7 |
| n-propylbenzene | 159.6 | 1–0.1 |
| Trimethylbenzene (1, 3, 5-; 1, 2, 4- and 1, 2, 3-isomers) | 164.6–176.5 | 25–6 |
| Indane | 177 | 9–1 |
| Methylindane homologs | 182–203 | |
| Dimethyl-and ethyl-indane homologs | not less than 200 | 2–0.5 |
| Naphthalene | 218 | |
| Dicyclopentadiene[1] | 170 | 0.2–5 |
| Undetected constituents[2] | 140–220 | 0.7–5.4 |

Note
[1] A portion or all of the dicyclopentadiene is sometimes depolymerized to cyclopentadiene by heating.
[2] The undetected constituents contain cyclopentadiene-methylcyclopentadiene codimer and methylcyclopentadiene dimer. Of these, some or all is sometimes depolymerized by application of heat to cyclopentadiene and methylcyclopentadiene. These monomers can be analyzed by means of said gas chromatography.

Among the ingredients determined above, all of the styrenes and their derivatives and the indenes and their derivatives are referred to herein as polymerizable ingredients. As indicated in Notes (1) and (2) of Table 1, when cyclopentadiene and methylcyclopentadiene are formed by application of heat and contained in the raw oil, these ingredients are also included in the above polymerizable ingredients.

In accordance with the present invention, one of the requirements for providing hydrocarbon resins having favorable anti-weathering characteristics and heat resistance is to use, as the raw oil, fractions having boiling points in the range of 140° to 220° C. which are separated from cracked oil fractions obtainable by cracking of petroleum and which satisfy the following conditions:

Conditions of raw oil (those fractions having boiling points in the range of 140° to 220° C. among cracked oil fractions obtainable by cracking of petroleum being referred to hereinafter as "starting raw oil", and the fractions satisfying the following conditions being referred to as "raw oil"):

(a) The amount of cyclopentadiene and methylcyclopentadiene together, i.e., the conjugated diolefin content, in the raw oil separated from the above-mentioned starting raw oil is not more than 1.0 wt %, and the ratio of the conjugated diolefin content as defined by the following equation (1) does not exceed 3.0%:

$$\text{Ratio of Conjugated Diolefin Content (\%)} = \frac{\text{Amount of conjugated diolefin in the raw oil (wt \%)}}{\text{Amount of polymerizable ingredients in the raw oil (wt \%)}} \times 100 \quad (1)$$

Note (1): The amount of the conjugated diolefin content means the sum of the amounts of cyclopentadiene and methylcyclopentadiene.

(b) The amount of indene and its alkyl derivatives in the raw oil separated from the starting raw oil mentioned hereinabove is not more than 4.0 wt %, and the ratio of the indene content as defined by the following equation (2) is not more than 12.0%:

$$\text{Ratio of Indene Content (\%)} = \frac{\text{Amount of indene and its alkyl derivatives in the raw oil (wt \%)}}{\text{Amount of polymerizable ingredients in the raw oil (wt \%)}} \times 100 \quad (2)$$

Each of the ingredients of the starting raw oil and the raw oil were analyzed by gas chromatography under the following conditions:

(i) Styrene, allylbenzene, 1, 3, 5-trimethylbenzene and o-ethyltoluene were analyzed on a 3 meter long Celite column (product of Johns Manville Corp.) containing 20 wt % of Apiezon L grease (product of Associated Electrical Industries Ltd.) under a helium flow rate of 60 cc/min. at 100° C.

(ii) The ingredients other than those mentioned in (i) above were analyzed on a Celite column having a length of 3 meters and containing 20 wt % of polyethylene glycol 4000 under a helium flow rate of 60 cc/min. at 125° C.

All the styrenes, indenes and their alkyl derivatives, as well as cyclopentadiene, and methylcyclopentadiene are polymerizable ingredients.

In accordance with the present invention, the method of preparing the cracked oil fractions having boiling points in the range of 140° to 220° C., i.e., the method of separating the raw oil from the starting raw oil and preparing it so as to satisfy the above-mentioned conditions may be carried out by any method including distillation under atmospheric or reduced pressure, extraction distillation or the like.

In order to satisfy one of the conditions in preparing the raw oil from the starting raw oil in accordance with the present invention, i.e. to prepare the raw oil so that the sum of the cyclopentadiene and methylcyclopentadiene amount (that is, the conjugated diolefin content) is not more than 1.0 wt % and in a ratio of not more than 3.0%, it is convenient to conduct a method of distilling and removing the conjugated diolefins by distillation of fractions which were previously prepared so as to satisfy the conditions required for the starting raw oil as to the sum of the indene and alkylindene content and the indene content ratio, which will be described hereinafter.

Since the boiling points of cyclopentadiene and methylcyclopentadiene of the conjugated diolefins are 42° C. and 70° C., respectively, and are below the initial boiling point of the starting raw oil, the operation of the above method can be readily carried out.

Where these conjugated diolefins are present in the starting raw oil as Diels-Alder dimers such as dicyclopentadiene or methylcyclopentadiene dimers, the step of adjusting the amount of indene and its alkyl derivatives and the indene content ratio to satisfy the conditions in accordance with the present invention may be conducted by atmospheric distillation, whereupon the conjugated diolefin dimers are depolymerized to conjugated diolefins which may then be removed from the raw oil by distillation.

Where the conjugated diolefin dimers, however, are present in the raw oil, as long as they are not present in large amounts, they need not necessarily be removed, because resins prepared therefrom do not impair anti-weathering and heat resistant properties, as compared with the case where resins are prepared in the presence of the conjugated diolefins.

In order to satisfy the second condition for the raw oil in accordance with the present invention, i.e. to prepare the raw oil so that the total amount of indene and its alkyl derivatives is not more than 4.0 wt % and in a ratio of not more than 12%, it is convenient to carry out distillation with precision on the starting raw oil or on fractions from which the conjugated diolefins were distilled and removed.

Since the boiling point of o-vinyltoluene under ambient pressure is 171° C., and that of indene under ambient pressure is 182.2° C., a raw oil satisfying the conditions set forth in accordance with the present invention may be obtained from the top of a distillation tower by utilizing the difference in their boiling points.

Heretofore, cracked oil fractions which are by-products of cracking of petroleum or the like have been used for raw materials of petroleum resins. This operation may merely control boiling points of the cracked oils in particular ranges; however, it cannot precisely distill off certain specific ingredients present in the cracked oil fractions, particularly amounts below a certain small level. This concept has not existed in the previous conventional manufacture of petroleum resins.

Furthermore, conventional convenient distilling towers may not permit the conjugated diolefins and the indenes in the raw oil to be finely controlled with respect to their amounts and content ratios (i.e. the ratio of the amount of said ingredients to the total amount of polymerizable ingredients in the raw oil) below these particular small levels. For this purpose, multi-stage distilling towers which may be operated under normal or reduced pressure are required.

This operation has not heretofore been employed in the manufacture of petroleum resins.

The raw oil prepared as hereinabove is subjected to polymerization in the presence of a Friedel-Crafts catalyst such as boron trifluoride, aluminum chloride, a boron trifluoride phenol complex compound or the like; boron trifluoride, boron trifluoride etherate, and boron trifluoride phenolate are preferable. The amount of the catalyst is from 0.01 to 5 wt % with respect to the weight of the raw oil. The polymerization may be carried out in the range of temperature of $-30°$ to $60°$ C. and over a period of time between 10 minutes and 15 hours. The catalyst may be removed after polymerization with an alkali such as sodium hydroxide or sodium carbonate. The reaction mixture, as needed, may be washed with water and further evaporated or distilled to remove unreacted oils or low molecular polymerizates, thereby providing excellent anti-weathering and heat resistant aromatic hydrocarbon resins having a softening point between 60° and 120° C. (as determined by JIS K-2531-1960) and bromine values of not greater than 15.

One of the essential conditions in accordance with the present invention is partial hydrogenation of particular amounts of the aromatic rings of aromatic hydrocarbon resins prepared as hereinabove. Where resins obtainable by polymerization of raw oils exceeding the conditions set for this invention are subjected to partial ring hydrogenation in the ranges set forth hereinabove, resistance to yellowing cannot be improved. Such resins, however, may provide resins having a favorable resistance to yellowing when the aromatic rings thereof are fully hydrogenated, but they produce cracks, lack of adhesion to road surfaces, and are inferior in dirt-repellency. Accordingly, these resins should not be construed as being encompassed within the scope of the present invention.

One of the essential conditions for the present invention is the employment of aromatic hydrocarbon resins in which 20 to 70%, and preferably 25 to 65%, of the aromatic rings are ring hydrogenated. Where ratios of ring hydrogenation are below the above lower limit, the traffic paints show insufficient improvement in resistance to yellowing. Where ratios of ring hydrogenation are above the upper limit, traffic paints resulting from such resins can provide a favorable resistance to yellowing, but show other unsatisfactory properties, such as the occurrence of cracks, lack of adhesion to road surfaces, and faster sedimentation of fillers used.

Although it is known from Japanese Patent Publication No. 23,058/1975 that hydrogenated petroleum resins are employed for melt type materials in road markings, it has now been found that only partially ring hydrogenated aromatic hydrocarbon resins obtainable by partially ring hydrogenating particular amounts of the aromatic rings of aromatic hydrocarbon resins obtained from specific fractions completely separated from the cracked oil fractions as mentioned hereinabove can provide traffic paints with effective resistance to yellowing, proper sedimentation of pigments used, dirt-repellency and flowability. In addition, they can prevent cracks from being produced, and they provide good adhesion to road surfaces.

In hydrogenating the resins manufactured under the conditions to be satisfied in accordance with the present invention, the methods of partial ring hydrogenation are not limited to particular ones, but may be carried out in any conventional manner. The hydrogenation may be conducted in the presence of a catalyst produced, for example, by using an active metal ingredient selected from the VIII metal group such as nickel, palladium, ruthenium, platinum, rhodium, cobalt or the like; the VI metal group such as tungsten, chromium, molybdenum or the like; the VII metal group such as rhenium, manganese or the like; metals such as copper and/or their compounds; alone or supported on a solid carrier such as alumina, silica-alumina, diatomaceous earth or the like. The hydrogenating reaction may be carried out in the presence or absence of a diluent at a temperature of 0° to 350° C., preferably 100° to 300° C., and a pressure of 10 to 300 kg/cm$^2$, and the reaction conditions may be chosen so as to provide aromatic ring hydrogenation of the aromatic hydrocarbon resins in the proportion of 20 to 70%. Solutions of the resins, obtained by decomposing the catalysts with an aqueous alkali solution or the like after the completion of polymerization and washing with water, may also be subjected intact to hydrogenation.

The proportion of ring hydrogenation of the aromatic rings of the aromatic hydrocarbon resins referred to in the present invention is a value determined by means of $^{13}$C-NMR spectrum of the resin and calculation by the following formula:

$$\text{Ratio of Ring Hydrogenation (\%)} = \left(1 - \frac{\text{Percent } C_A \text{ of Hydrocarbon Resin after Hydrogenation}}{\text{Percent } C_A \text{ of Hydrocarbon Resin before Hydrogenation}}\right) \times 100$$

wherein:
Percent of Aromatic Carbons:

$$\text{Percent } C_A = \frac{A}{A + S} \times 100$$

A: Integral range of the aromatic carbons in 130 to 160 p.p.m.
S: Integral range of saturated carbons in 18 to 70 p.p.m.

Melt type traffic paint compositions according to the present invention usually contain pigments, fillers, plasticizers, glass beads or the like as well as the hydrocarbon resins prepared as above.

The pigments and fillers may include titanium oxide, zinc white, chrome yellow, benzidine yellow, calcium carbonate, silica sand, talc, calcium sulfate or the like.

The plasticizers may include dibutyl phthalate, dioctyl phthalate, alkyd resins, paraffin wax, dioctyl azelate, dioctyl sebacate or the like.

The amounts of these materials are not particularly limited; it is generally preferred to mix 5 to 20 parts by weight of the hydrocarbon resin prepared as above with 1 to 7 parts by weight of the plasticizer, 35 to 80 parts by weight of the pigment and filler, and up to 20 parts by weight of glass beads.

In accordance with the present invention, rosin-modified materials such as maleic acid resins may be used in admixture with the hydrocarbon resins. It is preferred that the rosin-modified materials be used in amounts of not more than 100 parts by weight with respect to 100 parts by weight of the hydrocarbon resins. Where they are employed in greater amounts than this, the resultant traffic paints tend to produce cracks and are not satisfactory.

Methods of manufacturing the hot melt type traffic paints according to the present invention may be carried out by stirring the resins in the molten state and, as needed, the pigments, fillers, glass beads and other ingredients, or by mixing all of the ingredients and then melting the mixture.

The traffic paint compositions prepared by using the resins obtainable in accordance with the present invention have the following characteristics:
  (a) Initial whiteness is favorable because the resins in accordance with the present invention have excellent heat resistance.
  (b) Resistance to yellowing is favorable.
  (c) Adhesion to road surfaces is satisfactory, without occurrence of cracks.
  (d) Flowability is adequate.
  (e) Sedimentation of the fillers used is favorably improved.
  (f) Anti-contamination with respect to oil of paint coating is favorable.

The present invention will be described in more detail by way of examples, but they should not be construed as limiting the invention in any way, as long as they are not contrary to the concept of the present invention.

EXAMPLES 1-4 AND COMPARATIVE EXAMPLES 1-8

Experiment I

Cracked oil fractions having boiling points in the range of 140° to 220° C. obtained as by-products of steam cracking of naphtha have the following composition, as determined by means of gas chromatography:

| | |
|---|---|
| Polymerizable Ingredients (wt %) | 49.2 |
| Total Content of Cyclopentadiene and Methylcyclopentadiene (wt %) | 2.3 |
| Total content of Indene and Its Alkyl Derivatives (wt %) | 11.8 |
| Dicyclopentadiene Content (wt %) | 1.3 |
| Ratio of Conjugated Diolefin Content (%) | 4.7 |
| Ratio of Indene Content (%) | 24.0 |

This cracked oil fraction F was used as the starting raw oil and was supplied via a heater to a rectification tower A-1 of the type indicated in Table 2. The operating conditions for the rectification tower A-1 were set to provide a fraction from the tower top, said fraction satisfying one of the conditions for the raw oil in accordance with the present invention, i.e., having a total content of indene and its alkyl derivatives in an amount of not more than 4 wt % and a ratio of the indene content of not more than 12%. The conditions are shown in Table 2.

The fraction discharged from the A-1 rectification tower top was then charged into a rectification tower C-1 of the type indicated in Table 2. The operating conditions were set as indicated in Table 2 to provide, from the C-1 tower bottom, a raw oil satisfying the conditions therefor, i.e. having a total content of cyclopentadiene and methylcyclopentadiene in an amount of not more than 1.0 wt % and a conjugated diolefin content in a ratio of not more than 3%. The conjugated diolefins were discharged from the C-1 tower top.

TABLE 2

| Types and Operating Conditions for Rectification Towers | | |
|---|---|---|
| Towers | A-1 | C-1 |
| Type of Trays | Sieve Trays | Bubble Cap Trays |
| Plate Numbers | 30 | 7 |
| Charging Plates (from the bottom) | 18 | 4 |
| Charging Temperature (°C.) | 108 | 55 |
| Tower Bottom Temperature (°C.) | 145 | 120 |
| Tower Bottom Pressure (mmHg abs.) | 120 | 110 |
| Tower Top Temperature (°C.) | 93 | 25 |
| Tower Top Pressure (mmHg abs.) | 68 | 95 |
| Reflux Ratio | 5.0 | 2.0 |
| Period of Time of Residence at Tower Bottom (hours) | 1.0 | 0.5 |

By the above operation, 55 parts of raw oil of the present invention was obtained from 100 parts by weight of the starting raw oil. The composition of the raw oil thus prepared is as follows:

| | |
|---|---|
| Polymerizable Ingredients (wt %) | 46.5 |
| Total Content of Cyclopentadiene and Methylcyclopentadiene (wt %) | 0.7 |

-continued

| | |
|---|---|
| Total Content of Indene and Its Alkyl Derivatives (wt %) | 3.8 |
| Ratio of Conjugated Diolefin Content (%) | 1.5 |
| Ratio of Indene Content (%) | 8.2 |

A hydrocarbon resin was prepared by adding 0.5 part of phenol to 100 parts of the raw oil obtained by the above-mentioned operation; polymerizing the mixture with the addition thereto of boron trifluoride phenol complex compound in the amount of 0.5 wt % with respect to the raw oil at a temperature of 30° C. for a period of 3 hours; decomposing the catalyst with a sodium hydroxide aqueous solution; and removing the unreacted oil and low-polymerized materials by distillation after washing with water. The yield of the hydrocarbon resin with respect to the raw oil was 42.3%, and the resin had a softening point of 98° C., a melt hue of 7, and a bromine value of 13.

The resin (100 grams) thus obtained was then dissolved in 100 ml of cyclohexane and hydrogenated with 3 grams of a nickel-diatomaceous earth catalyst in a 500 ml autoclave at a hydrogen pressure of 100 kg/cm$^2$ and a temperature of 250° C. After completion of the reaction, the reaction mixture was cooled, withdrawn from the autoclave and then filtered to remove the catalyst. The solvent was then removed by distillation to thereby provide the hydrogenated resin.

By varying the periods of reaction, hydrogenated resins having varying degrees of ring hydrogenation were produced, as shown in Table 3.

TABLE 3

Reaction Conditions and Properties of Hydrogenated Resins

| Resin No. | Degree of Hydrogenation (%) | Softening Point (°C.) | Melt Hue (Gardner) | Melt Hue after Heat Resistance Test (Gardner) |
|---|---|---|---|---|
| 1-1 | 0 | 98.0 | 7 | 10 |
| 1-2 | 4 | 96.5 | 5 | 9 |
| 1-3 | 28 | 97.0 | below 1 | 7 |
| 1-4 | 37 | 97.0 | below 1 | 7 |
| 1-5 | 48 | 96.0 | below 1 | 7 |
| 1-6 | 58 | 96.5 | below 1 | 6 |
| 1-7 | 85 | 97.5 | below 1 | 6 |
| 1-8 | 100 | 97.0 | below 1 | 6 |

Experiment II

The cracked oil fraction F employed as the starting raw oil for distillation in Experiment I above was subjected to polymerization. The polymerization was carried out by adding 1.0 part by weight of phenol to 100 parts by weight of the cracked oil fraction F and reacting the mixture in the presence of 0.5 part by weight of boron trifluoride phenolate catalyst at 40° C. for 3 hours. The resulting product was treated in substantially the same manner as in Experiment I above to provide a hydrocarbon resin. The yield of the resin with respect to the raw oil was 47.0%, and it had a softening point of 101° C., a melt hue of 13, and a bromine value of 27.

The resultant resin was hydrogenated in substantially the same manner as in Experiment I by varying the reaction times to provide resins having varying degrees of ring hydrogenation as indicated in Table 4.

TABLE 4

Reaction Conditions and Properties of Hydrogenated Resins

| Resin No. | Degree of Hydrogenation (%) | Softening Point (°C.) | Melt Hue (Gardner) | Melt Hue after Heat Resistance Test (Gardner) |
|---|---|---|---|---|
| 2-1 | 4 | 99 | 8 | 13 |
| 2-2 | 45 | 100 | 1 | 8 |
| 2-3 | 100 | 99 | below 1 | 6 |

Hot melt type traffic paints according to the present invention were prepared using the resins prepared above and evaluated in ways which will be described hereinafter. For comparative purposes, hot melt type traffic paints were also prepared using the resins prepared in the above tables.

(1) Method of manufacturing hot melt type traffic paints:

The resins prepared in Experiments I and II were formulated with other paint ingredients as shown below.

| | |
|---|---|
| Hydrocarbon resin | 15 parts by weight |
| Dioctyl phthalate | 4 parts by weight |
| Titanium oxide (anatase type) | 6 parts by weight |
| Calcium carbonate | 15 parts by weight |
| Silica sand | 45 parts by weight |
| Glass beads | 15 parts by weight |
| Total | 100 parts by weight |

The mixture was then melted and stirred at a temperature between 200° and 210° C. for 20 minutes to provide melt type traffic paint compositions.

(2) Evaluation of compositions (a) Flowability

Each traffic paint composition (50 grams) was placed in a 100 ml stainless steel beaker and kept at a temperature of 220° C. for 10 minutes. The composition was poured from a height of 10 cm onto a flat iron plate, and the size of the disc formed by the composition was measured.

(b) Sedimentation of Filler:

Each traffic paint composition (50 grams) was placed in a 100 ml glass beaker, kept at 250° C. for 1 hour and then left to cool. The solidified composition was cut perpendicularly to the plane of the plate, and the height of the sedimentation of the filler used was measured and expressed as a percentage.

(c) Anti-weathering Test:

Test pieces were prepared according to JIS K 5665-1971 and were subjected to an accelerated anti-weathering test. The test was conducted in accordance with JIS K 5400-1970, where the samples were irradiated by an ultraviolet carbon arc at 63°±3° C. for 240 hours with water sprayed for 18 minutes in each interval of 102 minutes. The degree of yellowing of the coated layers and the amount of cracking were measured.

The test results according to the above procedures are shown in Table 5.

TABLE 5

| Resin No. | Flowability (mm) | Sedimentation of Filler (%) | Anti-Weathering Yellowing | Anti-Weathering Condition of Coating |
|---|---|---|---|---|
| Examples | | | | |
| 1 | 1-3 | 68 | 0 | 0.06 | No cracks |
| 2 | 1-4 | 71 | 0 | 0.07 | " |
| 3 | 1-5 | 69 | 0 | 0.06 | " |
| 4 | 1-6 | 70 | 0 | 0.06 | " |
| Comparative Examples | | | | |
| 1 | 1-1 | 70 | 0 | 0.153 | " |
| 2 | 1-2 | 69 | 0 | 0.150 | " |
| 3 | 1-7 | 58 | 23 | 0.06 | Cracks occurred |
| 4 | 1-8 | 54 | 33 | 0.06 | Cracks occurred |
| 5 | 2-1 | 70 | 0 | 0.234 | No cracks |
| 6 | 2-2 | 68 | 0 | 0.185 | " |
| 7 | 2-3 | 52 | 30 | 0.06 | Cracks occurred |
| 8[1] | — | 70 | 0 | 0.06 | Cracks occurred |

Note
[1] A rosin-modified resin (softening point, 110° C.) was employed in place of the hydrocarbon resin.

When the resins prepared by partially hydrogenating the aromatic rings of the resins obtained by polymerization of fractions in the ranges required for practicing the present invention were employed as binders for the hot melt type traffic paints, they were found to be superior to those of comparative examples in flowability, sedimentation of the filler, degree of yellowing of coating after the anti-weathering test, and amount of cracking.

What is claimed is:

1. A hot melt type traffic paint composition characterized by containing as a binder a partially ring-hydrogenated resin obtained by hydrogenating from 20 to 70% of the aromatic rings of an aromatic hydrocarbon resin having a softening point between 60° and 120° C. and a bromine value of not greater than 15 obtained by polymerization in the presence of a Friedel-Crafts catalyst of a fraction prepared so as to have a conjugated diolefin content of not more than 1.0 wt % and in a ratio of not more than 3.0% with respect to the total amount of polymerizable ingredients and a total content of indene and its alkyl derivatives of not more than 4.0 wt % and in a ratio of not more than 12.0% with respect to the total amount of polymerizable ingredients, said fraction being obtained by distillation of cracked oil fractions which have boiling points in the range of 140° to 220° C. and which are prepared by cracking of petroleum.

2. A hot melt type traffic paint composition according to claim 1, further containing a pigment, a filler, a plasticizer and glass beads.

3. A hot melt type traffic paint composition according to claim 1, in which 25 to 65% of the aromatic rings of said aromatic hydrocarbon resin are hydrogenated.

4. A hot melt type traffic paint composition according to claim 1, in which the partial ring hydrogenation is conducted at a temperature of up to 350° C. and a pressure between 10 and 350 kg/cm$^2$.

5. A hot melt type traffic paint composition according to claim 1, in which the partial ring hydrogenation is conducted in the presence of a catalyst.

6. A hot melt type traffic paint composition according to claim 5, in which said catalyst is an active metal ingredient and a carrier-supported catalyst.

7. A hot melt type traffic paint composition according to claim 6, in which the active metal ingredient is nickel, palladium, ruthenium, platinum, rhodium, cobalt, tungsten, chromium, molybdenum, rhenium, manganese, copper, or a compound containing one of these metals.

8. A hot melt type traffic paint composition according to claim 6, in which the carrier is alumina, silica-alumina, or diatomaceous earth.

9. A hot melt type traffic paint composition according to claim 1, in which said Friedel-Crafts catalyst is boron trifluoride, aluminum chloride, boron trifluoride phenol complex or boron trifluoride etherate.

10. A hot melt type traffic paint composition according to claim 1, in which the catalyst is employed in an amount of 0.01 to 5 wt % with respect to the amount of a raw oil.

11. A hot melt type traffic paint composition according to claim 1, in which the polymerization is carried out at a temperature between $-30°$ and $+60°$ C. for a period between 10 minutes and 15 hours.

12. A hot melt type traffic paint composition according to claim 1, in which the conjugated diolefin includes cyclopentadiene and methylcyclopentadiene.

13. A hot melt type traffic paint composition according to claim 1 in which said cracked oil fraction having boiling points in the range of 140° to 220° C. contain 1.6–28% styrene and its alkylated derivatives, 10–25 wt.% vinyl toluene, 3–16 wt.% indene and its alkyl derivatives, 10–17% of xylene, ethyl benzene and isopropyl benzene, 7–18% of ethyl toluene, 0.1–1% n-propylbenzene, 6–25% trimethylbenzene, 0.5–2% of indane and its alkyl derivatives and naphthalene, 0.2–5% of dicyclopentadiene before adjustment to have said contents of conjugated diolefin and indene.

* * * * *